United States Patent
Kim et al.

(10) Patent No.: US 11,837,376 B2
(45) Date of Patent: Dec. 5, 2023

(54) COMPOSITE CONDUCTIVE MATERIAL HAVING EXCELLENT DISPERSIBILITY, SLURRY FOR FORMING LITHIUM SECONDARY BATTERY ELECTRODE USING THE SAME, AND LITHIUM SECONDARY BATTERY

(71) Applicant: LG Chem, Ltd., Seoul (KR)

(72) Inventors: Tea Gon Kim, Daejeon (KR); Je Young Kim, Daejeon (KR); Hak Yoon Kim, Seoul (KR); Ki Won Sung, Daejeon (KR); Ye Lin Kim, Daejeon (KR); Joo Yul Baek, Daejeon (KR); Jung Keun Yoo, Daejeon (KR); Jun Muk Lim, Daejeon (KR); Seul Ki Kim, Gyeonggi-do (KR)

(73) Assignee: LG Energy Solution, Ltd.

( * ) Notice: Subject to any disclaimer, the term of this patent is extended or adjusted under 35 U.S.C. 154(b) by 322 days.

(21) Appl. No.: 17/116,558

(22) Filed: Dec. 9, 2020

(65) Prior Publication Data
US 2021/0104338 A1 Apr. 8, 2021

Related U.S. Application Data (62) Division of application No. 16/332,611, filed as application No. PCT/KR2018/006517 on Jun. 8, 2018, now Pat. No. 10,902,968.

(30) Foreign Application Priority Data

Jun. 8, 2017 (KR) .................. 10-2017-0071506

(51) Int. Cl.
C01B 32/15 (2017.01)
B01J 23/75 (2006.01)
(Continued)

(52) U.S. Cl.
CPC ............... *H01B 1/04* (2013.01); *B01J 23/75* (2013.01); *B01J 37/0201* (2013.01); *B01J 37/08* (2013.01);
(Continued)

(58) Field of Classification Search
CPC ........ B01J 23/75; B01J 37/0201; B01J 37/08; C01B 32/15; B82Y 40/00; B82Y 30/00; H01M 4/583
(Continued)

(56) References Cited

U.S. PATENT DOCUMENTS 7,585,434 B2 9/2009 Morita et al.
2008/0020282 A1 1/2008 Kim et al.
(Continued)

FOREIGN PATENT DOCUMENTS

JP H06333559 A 12/1994
JP 3010231 B2 2/2000
(Continued)

OTHER PUBLICATIONS

Tzeng "Growth of carbon nanofibers on activated carbon fiber fabrics." Carbon 44 (2006) 859-865 (Year: 2006).*
(Continued)

*Primary Examiner* — Tri V Nguyen
(74) *Attorney, Agent, or Firm* — Lerner David LLP (57) ABSTRACT

A method for producing a composite conductive material having excellent dispersibility is provided. The method includes supporting a catalyst on surfaces of carbon particles; heat treating the catalyst in a helium or hydrogen atmosphere such that the catalyst penetrate the surfaces of the carbon particles and are impregnated beneath the surfaces of the carbon particles at a contact point between the carbon particles and the impregnated catalyst; and heating the carbon particles having the impregnated catalyst dis-
(Continued)

posed therein in the presence of a source gas to grow carbon nanofibers from the impregnated catalyst to form a composite conductive material, wherein the source gas contains a carbon source, and wherein the carbon nanofibers extend from the contact point to above the surfaces of the carbon particles.

6 Claims, 1 Drawing Sheet

(51) Int. Cl.
| | |
|---|---|
| B01J 37/02 | (2006.01) |
| B01J 37/08 | (2006.01) |
| H01M 4/583 | (2010.01) |
| B82Y 40/00 | (2011.01) |
| H01B 1/04 | (2006.01) |
| H01M 4/13 | (2010.01) |
| H01M 4/36 | (2006.01) |
| H01M 4/62 | (2006.01) |
| H01M 10/0525 | (2010.01) |
| B82Y 30/00 | (2011.01) |

(52) U.S. Cl.
CPC ............... *B82Y 30/00* (2013.01); *B82Y 40/00* (2013.01); *C01B 32/15* (2017.08); *H01M 4/13* (2013.01); *H01M 4/364* (2013.01); *H01M 4/583* (2013.01); *H01M 4/62* (2013.01); *H01M 10/0525* (2013.01); *C01P 2004/32* (2013.01); *C01P 2004/64* (2013.01); *C01P 2006/11* (2013.01); *C01P 2006/40* (2013.01)

(58) Field of Classification Search
USPC ................ 252/502, 506, 500; 423/47.3, 460, 423/445 R, 447.3; 977/742
See application file for complete search history.

(56) References Cited

U.S. PATENT DOCUMENTS

| | | |
|---|---|---|
| 2008/0062616 A1 | 3/2008 | Matsuda et al. |
| 2008/0233402 A1 | 9/2008 | Carlson et al. |
| 2009/0099016 A1 | 4/2009 | Carruthers et al. |
| 2009/0220767 A1 | 9/2009 | Schlogl et al. |
| 2014/0162121 A1 | 6/2014 | Ryu et al. |
| 2014/0370282 A1 | 12/2014 | Yamamoto et al. |

FOREIGN PATENT DOCUMENTS

| | | | |
|---|---|---|---|
| JP | 2011216472 A | | 10/2011 |
| JP | 2013077475 A | | 4/2013 |
| JP | 5440488 B2 | | 3/2014 |
| JP | 2016088763 A | | 5/2016 |
| JP | 6045860 B2 | | 12/2016 |
| KR | 100733580 B1 | | 6/2007 |
| KR | 100835883 B1 | | 6/2008 |
| KR | 20080071038 A | | 8/2008 |
| KR | 20120108902 A | | 10/2012 |
| KR | 2014-0044570 A | * | 4/2014 |
| KR | 20140050101 A | | 4/2014 |
| KR | 20140076161 A | | 6/2014 |
| KR | 20140121752 A | | 10/2014 |

OTHER PUBLICATIONS

Anonymous: "Carbon Black—Vulcan XX 72R", FuelCell Store, Nov. 16, 2015, 2 pages. XP055228540. Retrieved from the Internet: URL:http://fuelcellstore.com/vulcan-xc-72r.

Cabot, "Vulcan® XC72R—Typical Applications," Carbon Black, Dec. 31, 2002, 1 page. XP055927952.

Matweb, "TIMCAL TIMREX® SLP30 Primary Synthetic Potato®— Shape Graphite," TIMCAL TIMREX, Jun. 3, 2022, 2 pages. XP055927984.

Calderon et al., "Oxidation of CO and Methanol on Pd—Ni Catalysts Supported on Different Chemically-Treated Carbon Nanofibers," Nanomaterials, vol. 6 (10), Oct. 18, 2016, 18 pages.

Dasgupta, "Formation of bamboo shaped carbon nanotubes on carbon black in a fluidized bed." J. Nanopart Res (2012) 14:728 (Year: 2012).

Fuelcellstore website https://www.fuelcellstore.com/msds-sheets/vulcan-xc72r-msds.pdf (Year: 2012).

Holade "Enhancing the available specific surface area of carbon supports to boost the electroactivity of nanostructured Pt catalysts." Phys. Chem. Chem. Phys., 2014, 16, 25609 (Year: 2014).

Lim et al., "Selective synthesis of thin carbon nanofilbers: I, Over nickel-iron alloys supported on carbon black," Carbon, vol. 42 (8-9), Jan. 1, 2004, pp. 1765-1781.

Mitsubishi website http://www.carbonblack.jp/en/products/list2_01.html (Year: 2020).

Search report from International Application No. PCT/KR2018/006517, dated Oct. 16, 2018.

Supplementary European Search Report dated Oct. 11, 2019 for EP18813462.

Takehira et al., "Catalytic growth of crabon fibers from methane and ethylene on carbon-supported Ni catalysts," Applied Catalysis A: General, vol. 283 (1-2), Apr. 8, 2005, pp. 137-145.

* cited by examiner

COMPOSITE CONDUCTIVE MATERIAL HAVING EXCELLENT DISPERSIBILITY, SLURRY FOR FORMING LITHIUM SECONDARY BATTERY ELECTRODE USING THE SAME, AND LITHIUM SECONDARY BATTERY

CROSS-REFERENCE TO RELATED APPLICATION(S)

This application is a divisional of U.S. application Ser. No. 16/332,611, filed Mar. 12, 2019, which is a national phase entry under 35 U.S.C. § 371 of International Application No. PCT/KR2018/006517, filed on Jun. 8, 2018, which claims priority to Korean Patent Application No. 10-2017-0071506 filed on Jun. 8, 2017, and the disclosures of which are incorporated by reference herein.

The present invention relates to a composite conductive material for a secondary battery having excellent dispersibility, a slurry including the same, an electrode including the same, and a secondary battery including the same. More particularly, a composite conductive material has a structure including carbon particles, a catalyst (i.e., a carbon nanofiber (CNF) synthesis catalyst) impregnated beneath surfaces of the carbon particles at a contact point between the carbon particles and the impregnated catalyst, and carbon nanofibers extending from the contact point beneath the surfaces of the carbon particles to above the surfaces of the carbon particles.

RELATED ART

As technology development and demand for mobile devices increase, the demand for secondary batteries as energy sources is rapidly increasing. Among such secondary batteries, lithium secondary batteries having a high energy density and voltage, a long cycle life and a low self discharge rate are commercialized and widely used. In addition, as electrodes for such a high-capacity lithium secondary battery, studies have been actively made on methods for manufacturing electrodes having higher energy density per unit volume by improving electrode density.

In general, since the high-density electrode is formed by forming the electrode active material particles having a size of several μm to several tens of μm by a high-pressure press, the particles are deformed, the space between the particles is reduced, and electrolyte permeability is likely to be lowered.

In order to solve such a problem, a conductive material having excellent electrical conductivity and strength is used at the time of manufacturing an electrode. When a conductive material is used in the production of an electrode, the conductive material is dispersed among the compressed electrode active materials, thereby allowing micropores to be maintained between the active material particles, thereby facilitating the penetration of the electrolyte and reducing the resistance in the electrode due to excellent conductivity. Among these conductive materials, carbon black has been mainly used. In recent years, the use of carbon nanotubes, planar graphenes, and carbon nanofibers, which are fiber type carbon conductive materials capable of further reducing the electrode resistance by forming electrical conduction paths in the electrode, is increasing.

However, carbon nanofibers and carbon nanotubes have advantages of excellent electrical conductivity, but they have disadvantages in that they are difficult to disperse due to the characteristics of the materials themselves grown in the bundle type and the entangled type, and in order to improve the dispersibility, even if the above-mentioned method is adopted, the surface reaction and the like are generated, and thus the utility of the application efficiency is limited in practical use.

Even in the case of planar graphene, the electrical conductivity is excellent, but it is difficult to manufacture a single layer of graphene. Further, rigid graphene having a layer with a thickness of 10 nm or more is inefficient. In the case of soft graphene having a layer thickness of 10 nm or less, it is known that there is a limitation that the mobility of the electrolyte is limited due to the planar contact of the conductive material.

Various attempts have been made to solve this problem. A method of dispersing carbon nanotubes in a dispersion medium through a mechanical dispersion treatment such as an ultrasonic treatment has been proposed. However, in this method, while the ultrasonic wave is irradiated, the dispersibility is excellent. However, when the ultrasonic irradiation is finished, aggregation of the carbon nanotubes starts and aggregation occurs when the concentration of the carbon nanotubes increases. In addition, a method of dispersing and stabilizing carbon nanotubes by using various dispersants has been proposed. However, these methods also have a problem in that when the fine carbon fibers are dispersed at a high concentration in a dispersion medium, handling becomes difficult due to an increase in viscosity.

Accordingly, it is required to develop a conductive material having excellent electrical conductivity and excellent dispersibility.

DISCLOSURE

Technical Problem

A first object of the present invention is to provide a composite conductive material for a secondary battery having excellent dispersibility.

A second object of the present invention is to provide an electrode slurry including the composite conductive material, an electrode for a secondary battery, and a lithium secondary battery.

Technical Solution

According an aspect of the present invention, there is provided a composite conductive material having excellent dispersibility, including: spherical carbon particles; a catalyst impregnated beneath surfaces of the spherical carbon particles at a contact point between the spherical carbon particles and the impregnated catalyst; and carbon nanofibers extending from the contact point beneath the surfaces of the spherical carbon particles to above the surfaces of the spherical carbon particles.

Here, the carbon particles may be carbon black and have a primary particle diameter of 5 to 500 nm.

The carbon particles may have a powder density of 0.025 g/cc or more.

The catalyst may be one or more mixed metals selected from the group consisting of iron, nickel, cobalt, manganese, molybdenum, zinc and vanadium.

A specific surface area of the composite conductive material may be 300 $m^2/g$ or less.

The content of the carbon nanofibers may be 20 to 80 parts by weight based on 100 parts by weight of the composite conductive material.

The shape of the carbon nanofibers may be any one selected from the group consisting of a platelet shape, a herringbone shape and a tubular shape.

According to another aspect of the present invention, there is provided a method for producing a composite conductive material having excellent dispersibility, including: (S1) supporting a catalyst on surfaces of carbon particles; (S2) heat treating the catalyst in a helium or hydrogen atmosphere such that the catalyst penetrates the surfaces of the carbon particles and is impregnated beneath the surfaces of the carbon particles at a contact point between the carbon particles and the impregnated catalyst; and (S3) heating the carbon particles impregnated with the catalyst in the presence of a source gas to grow carbon nanofibers from the impregnated catalyst particles to form a composite conductive material, wherein the nanofibers extend from the contact point beneath the surfaces of the carbon particles to above the surfaces of the carbon particles, and wherein the source gas contains a carbon source.

Here, the method may further include oxidizing the carbon particles before the catalyst is provided to the carbon particles in step (S1).

The method may further including heat-treated the carbon nanofibers in an inert atmosphere after step (S3).

The carbon nanofibers, grown in step (S3), may be grown in 15 minutes or less.

The carbon source may be one or a mixture of two or more selected from the group consisting of carbon monoxide, methane, ethane, ethylene, ethanol, acetylene, propane, propylene, butane, butadiene, pentane, pentene, and cyclopentadiene.

The catalyst particles may not be removed after formation of the carbon nanofibers.

According to further another aspect of the present invention, there is provided a slurry for electrode formation including the composite conductive material.

According to further another aspect of the present invention, there are provided an electrode for a secondary battery including the composite conductive material, and a lithium secondary battery including the electrode.

Effect of the Invention

The composite conductive material for a secondary battery according to the present invention has the effect of complementing the disadvantage of the highly dispersed carbon nanofibers having high conductivity by synthesizing and growing carbon nanofibers directly from spherical carbon particles having excellent dispersibility.

The composite conductive material for a secondary battery according to the present invention is characterized in that a catalyst supported on spherical carbon particles is heat-treated in a helium or hydrogen atmosphere to nano-drill and penetrate into carbon particles, and carbon nanofibers are synthesized and grown from the penetrated catalyst, and thus the contact bonding force between the spherical carbon particles and the linear carbon nanofibers is further strengthened and the contact resistance between the two materials is minimized.

Since the method for producing a composite conductive material for a secondary battery according to the present invention uses cobalt or molybdenum as a main catalyst, a residual catalyst problem related to the formation of dendrite or the like in the application of a conductive material for a secondary battery may be prevented, and the catalyst removal process itself can be omitted, so that it is possible to maintain the morphology unique to the material and to reduce costs.

DETAILED DESCRIPTION OF THE PREFERRED EMBODIMENTS

Figure 1:
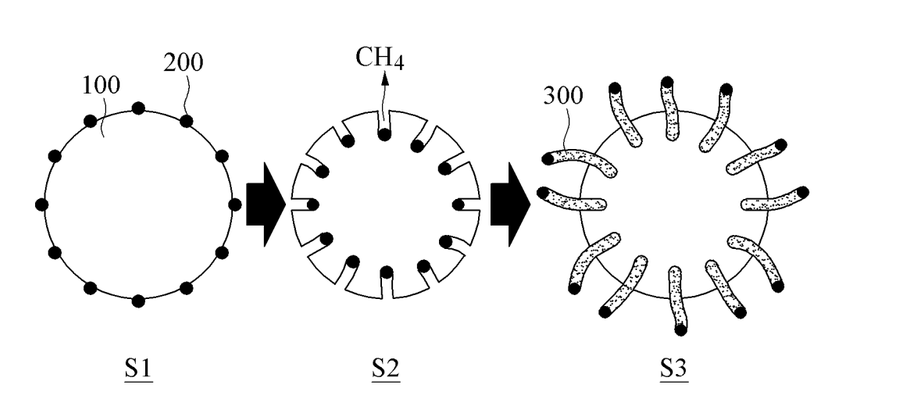
The FIGURE is a conceptual view showing a manufacturing process of a composite conductive material and its structure according to the present invention.

Hereinafter, the present invention will be described in detail in order to facilitate understanding of the present invention. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The composite conductive material according to the present invention includes spherical carbon particles; catalyst particles impregnated beneath surfaces of the spherical carbon particles at a contact point between the spherical carbon particles and the impregnated catalyst; and carbon nanofibers extending from the contact point beneath the surfaces of the spherical carbon particles to above the surfaces of the spherical carbon particles.

A composite conductive material having excellent dispersibility is produced by steps of (S1) supporting a catalyst on surfaces of carbon particles; (S2) heat treating the catalyst in a helium or hydrogen atmosphere such that the catalyst penetrate the surfaces of the carbon particles and are impregnated beneath the surfaces of the carbon particles at a contact point between the carbon particles and the impregnated catalyst; and (S3) heating the carbon particles having the impregnated catalyst in the presence of a source gas to grow carbon nanofibers from the impregnated catalyst particles to form a composite conductive material, wherein the a source gas containing a carbon source, and wherein the carbon nanofibers extend from the contact point beneath the surfaces of the carbon particles to above the surfaces of the carbon particles.

In the conventional carbon particle-carbon nanofiber composite or carbon particle-carbon nanotube composite, there is a problem that the carbon nanofibers are separated from the carbon particles due to a lack of surface binding force. In order to solve such problems, the carbon nanofiber carbon nanotubes can be grown from a contact point between the impregnated catalyst and the carbon particles, wherein the contact point is obtained by penetrated the catalyst into the inside of the carbon particles through nano-drilling. That is, since the growth of carbon nanofibers is not grown from the surface of the carbon particles but is grown from the contact point at which the catalyst is penetrated into the inside of the carbon particles by nano drilling, improved adhesion is shown.

Referring to the FIGURE, a first step S1 of supporting carbon nanofiber synthesis catalyst (200) on spherical carbon particles (100) is illustrated. The catalyst functions as a seed for synthesis of carbon nanofibers.

The spherical carbon particles are generally carbon black, and preferably have a primary particle diameter of 5 to 500 nm, more preferably 10 to 300 nm, and most preferably 20 to 100 nm. Here, the primary particles of carbon black may be defined as carbon black particles in the form of a single particle.

The spherical carbon particles are preferably as small as possible because of their high electrical conductivity. When the size of the particle diameter is less than 5 nm, since the conductive materials are agglomerated to each other, the conductive materials are not uniformly dispersed, and the catalyst supporting and nano-drilling treatments for growing the carbon nanofibers are limited. In addition, when the size of the particle diameter exceeds 500 nm, the efficiency of use of the conductive material deteriorates and the operating performance of the battery may deteriorate.

There is no particular limitation on the kind of the carbon black. However, an acetylene black series having a high carbon source purity, a low impurity content, a high electric conductivity by heat treatment at a high temperature, a high density of the material itself, and a uniform particle size is preferable.

The powder density of the carbon particles is preferably 0.025 g/cc or more, more preferably 0.03 g/cc or more.

In the present invention, when the powder density of the carbon particles is less than 0.025 g/cc, it is not preferable in terms of improving the binding force between the carbon particles and the carbon nanofibers.

As described above, the present invention is characterized by improving the dispersibility by enhancing the binding force between the carbon particles and the carbon nanofibers. Therefore, in order to achieve such an object, highly dense carbon particles with a high density of powder, which have no the interior space of possible carbon particles and are filled with carbon layers, are much preferred.

The synthesis catalyst of the carbon nanofibers is preferably a mixed metal of one or more selected from the group consisting of iron, nickel, cobalt, manganese, molybdenum, zinc and vanadium, and the metal elements may be contained in an amount of 50 ppm or less, more preferably 30 ppm or less, and most preferably 5 ppm or less.

The use of cobalt as the main catalyst and vanadium as the cocatalyst can prevent the problem of dendrite formation in the secondary battery without a separate catalytic removal process, and consequently, by reducing the metal content as a residual impurity in the composite conductive material, it is possible to exhibit better conductivity without worrying about side reactions in the electrode.

In particular, when a non-magnetic catalyst such as cobalt and vanadium is used, since the catalyst removal step can be omitted, the formation of dendrites during the cell reaction can be suppressed and the specific morphology of the material itself can be maintained.

Also, it is advantageous that various carbon nanofibers such as platelet, herringbone, and tubular type according to synthesis gas, synthesis temperature, and synthesis time can be prepared using such catalysts. According to a preferred embodiment of the present invention, the shape of the carbon nanofibers is preferably a tubular shape in terms of electrical conductivity.

The method for supporting the carbon nanofiber synthesis catalyst on the carbon particles is not particularly limited, but in the examples of the present invention, the above-described metal precursor aqueous solution is prepared, the prepared catalyst is put in the carbon particle support, and is then stirred and vacuum-dried for a predetermined time.

According to an embodiment of the present invention, the surface of the carbon particles may be oxidized in advance before the carbon nanofiber synthesis catalyst is supported on the surface of the carbon particles.

Both wet and dry methods of oxidizing the surface of carbon particles can be applied. The wet method is a method of oxidizing the surface of carbon particles by heat treatment in a solution such as $H_2O_2$ or $HNO_3$, and the dry method is a method of oxidizing the surface by heat treatment in a gas atmosphere such as air or water vapor.

When the surface of the carbon particles is oxidized before the catalyst is supported, the functional groups of the surface oxidized portions of the carbon particles act as anchorage sites for supporting the catalyst, so that the size of the carbon nanofibers can be controlled and dispersed, which is advantageous Also, in this state, heat treatment in helium or hydrogen atmosphere causes catalytic reaction on the surface of spherical carbon particles, they are gasificated as $CO$, $CO_2$, $CH_4$, $H_2O$, etc., and nano-drilling phenomenon that the catalyst penetrates into carbon particles is accelerated, which are advantageous.

After the step of supporting the catalyst on the surface of the spherical carbon particles, the step S2 of infiltrating the catalyst into the interior of the carbon particles is carried out.

When the catalyst-supported carbon particles are heat-treated in a helium or hydrogen atmosphere, gases such as $CH_4$, $CO$, $CO_2$ and $H_2O$ are generated at a contact point between the catalyst and the carbon particles, and the carbon particles are etched, which is call "nano-drilling." The FIGURE illustrates a catalyst being penetrating into carbon particles by nano-drilling at step S2.

As a method for synthesizing and growing carbon nanofibers (300) (at step S3 in the FIGURE) constituting the composite conductive material according to an embodiment of the present invention, a known manufacturing method or a known manufacturing apparatus can be used. For example, chemical vapor deposition (CVD) may be used. Here, the chemical vapor deposition method is a concept including a high speed chemical vapor deposition method, an inductively coupled plasma chemical vapor deposition method, a low pressure chemical vapor deposition method, a superficial chemical vapor deposition method, a metal organic chemical vapor deposition method, and the like. Known manufacturing apparatuses include stationary phase reactors, fluidized bed reactors, batch type reactors, or continuous type reactors.

The preparation of carbon nanofibers according to the chemical vapor deposition method is carried out by injecting catalyst-supported carbon particles into the reactor and injecting a carbon source at a temperature not lower than the pyrolysis temperature of the carbon source, or not higher than the melting point of the supported metal catalyst. As such, when the carbon source is injected, the carbon source is pyrolyzed by heat at a high temperature and then permeated into the supported catalyst. When the pyrolytic carbon source that has permeated into the supported catalyst is saturated, the carbons are precipitated from the saturated supported catalyst and the carbon nanofibers are grown.

Further, the carbon source can supply carbon, and can be used without any particular limitation as long as it can exist in a gaseous phase at a temperature of 300° C. or higher. Specifically, it may be a carbon-based compound having 6 or less carbon atoms. More specifically, it may be carbon monoxide, methane, ethane, ethylene, ethanol, acetylene, propane, propylene, butane, butadiene, pentane, pentene, cyclopentadiene, hexane, cyclohexane, benzene or toluene, and any one or a mixture of two or more of them may be used.

The composite conductive material of the present invention can realize necessary physical properties through control of kinds of catalyst, heat treatment temperature and atmosphere in the manufacturing process.

In the present invention, the growth yield or synthesis yield of carbon nanofibers synthesized from carbon particles may be 10% to 55%, preferably 20% to 50%, and most preferably 35% to 45%. when calculated according to the following Formula 1. The larger the growth yield value of the carbon nanofibers is, the more preferable it is from the viewpoint of conductivity, but it is not preferable from the viewpoint of dispersibility when it is too large.

CNF Growth Yield (%)=×100 [Formula 1]

The composite conductive material of the present invention preferably has a specific surface area of 300 m$^2$/g or less, more preferably 50 to 300 m$^2$/g, and most preferably 150 to 280 m$^2$/g. It is because, if the specific surface area of the conductive material exceeds 300 m$^2$/g, the amount of the binder used increases. Therefore, in order to have the specific surface area in the above-mentioned range, it is preferable to set the synthesis and growth time of the carbon nanofiber within a short time range of 15 minutes or less, preferably 12 minutes or less, most preferably 5 minutes or more and 10 minutes or less.

According to a preferred embodiment of the present invention, in order to further enhance the binding force between the carbon particles and the carbon nanofibers, a step of completing the growth of the carbon nanofibers and then performing a heat treatment in an inert atmosphere may be further performed. The temperature during the heat treatment may be 650° C. to 900° C., more preferably 750° C. to 850° C., and most preferably 775° C. to 825° C. The heat treatment time is 10 minutes to 90 minutes, preferably 20 minutes to 60 minutes, and most preferably 30 minutes to 45 minutes.

The carbon particle-carbon nanofiber composite conductive material of the present invention produced by the above method has a carbon nanofiber content of 20 to 80 parts by weight, preferably 25 to 70 parts by weight, and most preferably 30 to 60 parts by weight per 100 parts by weight of the composite conductive material. When the content of the carbon nanofibers is less than 20 parts by weight, it is not preferable from the viewpoint of conductivity. When the content is more than 80 parts by weight, the carbon nanofibers are not preferable from the viewpoint of dispersibility.

The slurry for electrode formation and the electrode for a secondary battery including the conductive material of the present invention according to another embodiment of the present invention will be described in detail.

The secondary battery electrode may be a positive electrode or a negative electrode, and more specifically, it may be a positive electrode. In the case of a negative electrode, a conductive material is applied preferably to a composite of a metallic compound or a metal oxide capable of alloying with Si, Ti, or Sn-based lithium, which has a larger volume expansion at the time of charging than that of a graphite material alone, or a graphite containing the same. The electrode may be manufactured according to a conventional method except that it includes the conductive material described above.

Specifically, when the electrode is an positive electrode, the positive electrode includes an positive electrode current collector and an positive electrode active material layer formed on the positive electrode current collector.

The positive electrode current collector is not particularly limited as long as it has electrical conductivity without causing chemical changes in the battery. For example, the positive electrode current collector may be made of a metal such as stainless steel, aluminum, nickel, titanium, sintered carbon, or aluminum or stainless steel of which the surface is treated with carbon, nickel, titanium, or silver, or the like. In addition, the positive electrode current collector may have a thickness of 3 to 500 μm, and fine unevenness may be formed on the surface of the current collector to increase the adhesive force of the positive electrode active material. It may be used as various forms such as a film, a sheet, a foil, a net, a porous body, a foam, and a nonwoven fabric.

The positive electrode active material layer formed on the positive electrode current collector is applied by a slurry for formation of the positive electrode, which further includes a positive electrode active material, a conductive material, and optionally a binder.

The positive electrode active material may be a compound capable of reversibly intercalating and deintercalating lithium (ritied intercalation compound), and specifically may be a metal such as cobalt, manganese, nickel, and a composite metal oxide consisting of a combination thereof and lithium.

More specifically, the positive electrode active material may be a lithium-manganese-based oxide (for example, $LiMnO_2$, $LiMn_2O$, etc.), a lithium-cobalt oxide (for example, $LiCoO_2$), a lithium-nickel oxide (for example, $LiNiO_2$, etc.), a lithium-nickel-manganese oxide (for example, $LiNi_{1-Y}Mn_YO_2$ (where 0<Y<1), $LiMn_{2-Z}Ni_ZO_4$ (where 0<Z<2), etc.), a lithium-nickel-cobalt oxide (for example, $LiNi_{1-Y}Co_YO_2$ (where 0<Y<1), a lithium-manganese-cobalt oxide (for example, $LiCo_{1-Y}Mn_YO_2$ (where 0<Y<1), $LiMn_{2-Z}Co_ZO_4$ (where 0<Z<2), etc.), a lithium-nickel-manganese-cobalt oxide (for example, $Li(Ni_PCo_QMn_R)O_2$ (where 0<P<1, 0<Q<1, 0<R<1, P+Q+R=1) or $Li(Ni_PCo_QMn_R)O_4$ (where, 0<P<2, 0<Q<2, 0<R<2, P+Q+R=2), etc.), or a lithium-nickel-cobalt-transition metal (M) oxide (for example, $Li(Ni_PCo_QMn_RM_S)O_2$ wherein M is at least one element selected from the group consisting of Al, Fe, V, Cr, Ti, Ta, Mg, and each of Mo, and P, Q, R, and S is the atomic fraction of independent elements and 0<P<1, 0<Q<1, 0<R<1, 0<S<1, P+Q+R+S=1). Further, the lithium transition metal oxide may be doped with tungsten W or the like. Among these, the positive electrode active material is preferably $LiCoO_2$, $LiMnO_2$, $LiNiO_2$, lithium nickel manganese cobalt oxide (for example, $Li(Ni_{0.6}Mn_{0.2}Co_{0.2})O_2$, $LiNi_{0.5}Mn_{0.3}Co_{0.2}O_2$, or $LiNi_{0.8}Mn_{0.1}Co_{0.1}O_2$), or lithium nickel cobalt aluminum oxide (e.g., $LiNi_{0.8}Co_{0.15}Al_{0.05}O_2$, etc.).

The content of the positive electrode active material may be between 70% by weight and 98% by weight based on the total weight of the positive electrode active material layer based on the solid content. If the content of the positive electrode active material is less than 70% by weight, the capacity may decrease. If the content of the positive electrode active material exceeds 98% by weight, the relative content of the binder and the conductive material may decrease, thereby decreasing the adhesive force on the positive current collector and the conductivity.

The conductive material is the same as that described above, and may be included in an amount of 1% by weight to 30% by weight based on the total weight of the positive electrode active material layer.

In addition, the binder serves to improve the adhesion between the positive electrode active material particles and the adhesion between the positive electrode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro-rubber, or various copolymers thereof, and one kind or a mixture of two or more kinds of them may be used. The binder may be included in an amount of 1% by weight to 30% by weight based on the total weight of the positive electrode active material layer.

The positive electrode may be produced by a conventional positive electrode manufacturing method, except that the conductive material described above is used. Specifically, a composition for forming the positive electrode active material layer prepared by dispersing or dissolving the above-mentioned positive electrode active material, a binder, and optionally a conductive material in a solvent is applied on the positive electrode current collector, followed by drying and rolling, or by casting the composition for forming the positive electrode active material layer on a separate support, and then peeling off the support from the support, to thereby obtain a film, then the film is laminated on the positive electrode current collector to thereby prepare the positive electrode.

Here, the solvent is not particularly limited as long as it is generally used in the related art. Specifically, examples of the solvent include dimethyl sulfoxide (DMSO), isopropyl alcohol, N-methylpyrrolidone (NMP), acetone, water, and the like. Or a mixture of two or more thereof may be used. The amount of the solvent to be used is sufficient to dissolve or disperse the positive electrode active material, the conductive material and the binder in consideration of the coating thickness of the slurry and the yield of the slurry, and then to have a viscosity capable of exhibiting excellent thickness uniformity when applied.

When the electrode is a negative electrode, the negative electrode includes a negative electrode collector and a negative electrode active material layer disposed on the negative electrode collector.

The negative electrode current collector is not particularly limited as long as it has high conductivity without causing chemical changes in the battery. Examples of the negative electrode current collector include copper, stainless steel, aluminum, nickel, titanium, sintered carbon, copper or stainless steel of which the surface has been treated with carbon, nickel, titanium, silver or the like, an aluminum-cadmium alloy, or the like. In addition, the negative electrode collector may have a thickness of 3 µm to 500 µm, and similarly to the positive electrode collector, fine unevenness may be formed on the surface of the collector to enhance the bonding force of the negative electrode active material. It may be used as various forms such as a film, a sheet, a foil, a net, a porous body, a foam, and a nonwoven fabric.

The negative electrode active material layer is prepared by coating a negative electrode slurry containing a negative electrode active material, a conductive material, and optionally a binder.

As the negative electrode active material, a compound capable of reversibly intercalating and deintercalating lithium may be used. Specific examples thereof include carbonaceous materials such as artificial graphite, natural graphite, graphitized carbon fiber and amorphous carbon; A metal compound capable of alloying with lithium such as Si, Al, Sn, Pb, Zn, Bi, In, Mg, Ga, Cd, Si alloy, Sn alloy or Al alloy; Metal oxides such as $SiO_x$ (0<x<2), $SnO_2$, vanadium oxide, and lithium vanadium oxide that can dope and dedope lithium; or a composite containing the above-described metallic compound and a carbonaceous material such as a Si—C composite or a Sn—C composite, and any one or a mixture of two or more of them. Also, a metal lithium thin film may be used as the negative electrode active material. As the carbon material, both low-crystalline carbon and high-crystalline carbon may be used. Examples of the low-crystalline carbon include soft carbon and hard carbon. Examples of the highly crystalline carbon include amorphous, flaky, scaly, spherical or fibrous natural graphite natural graphite or artificial graphite, Kish graphite, pyrolytic carbon, mesophase pitch based carbon fiber, mesocarbon microbeads, mesophase pitches and petroleum or coal tar pitch derived cokes.

In addition, the binder and the conductive material may be the same as those described above for the positive electrode.

The negative electrode may be formed by applying a negative electrode slurry prepared by dispersing or dissolving a negative electrode active material, a conductive material, and optionally a binder in a solvent on the negative electrode collector, followed by drying; or by casting the composition for forming a negative electrode on a separate support and then peeling the support from the support to laminate the obtained film on the negative electrode collector. The solvent may be the same as described above for the positive electrode.

According to another embodiment of the present invention, there is provided an electrochemical device including the electrode. The electrochemical device may be specifically a battery or a capacitor, and more specifically, it may be a lithium secondary battery.

Specifically, the lithium secondary battery includes a positive electrode, a negative electrode disposed opposite to the positive electrode, a separator interposed between the positive electrode and the negative electrode, and an electrolyte. At least one of the positive electrode and the negative electrode may be the electrode. The lithium secondary battery may further include a battery container for storing the positive electrode, the negative electrode and the electrode assembly of the separator, and a sealing member for sealing the battery container.

In the lithium secondary battery, the separator separates the negative electrode and the positive electrode to provide a moving path of lithium ions. The separator can be used without any particular limitation as long as it is used as a separator in a lithium secondary battery. Particularly, it is preferable to have a low resistance and an excellent ability to impregnate the electrolyte. Specifically, porous polymer films, for example, porous polymer films made of polyolefin-based polymers such as ethylene homopolymers, propylene homopolymers, ethylene/butene copolymers, ethylene/hexene copolymers and ethylene/methacrylate copolymers may be used. Further, a nonwoven fabric made of a conventional porous nonwoven fabric, for example, glass fiber of high melting point, polyethylene terephthalate fiber, or the like may be used. In order to secure heat resistance or mechanical strength, a coated separator containing a ceramic component or a polymer material may be used, and may be optionally used as a single layer or a multilayer structure.

Examples of the electrolyte used in the present invention include an organic liquid electrolyte, an inorganic liquid electrolyte, a solid polymer electrolyte, a gel polymer electrolyte, a solid inorganic electrolyte, and a molten inorganic electrolyte which can be used in the production of a lithium secondary battery, but the present invention is not limited to these examples.

The organic solvent may be any organic solvent that can act as a medium through which ions involved in an electrochemical reaction of a battery can move. Specifically, examples of the organic solvent include ester solvents such as methyl acetate, ethyl acetate, γ-butyrolactone and γ-caprolactone; ether solvents such as dibutyl ether or tetrahydrofuran; ketone solvents such as cyclohexanone; aromatic hydrocarbon solvents such as benzene and fluorobenzene; carbonate solvents such as dimethyl carbonate (DMC), diethylcarbonate (DEC), methylethylcarbonate (MEC), ethylmethylcarbonate (EMC), ethylene carbonate (EC), and propylene carbonate (PC); alcohol solvents such as ethyl alcohol and isopropyl alcohol; nitriles such as R—CN (R is a straight, branched or cyclic hydrocarbon group of C2 to C20, which may contain a double bond aromatic ring or ether bond); amides such as dimethylformamide; dioxolanes such as 1,3-dioxolane; or sulfolane. Among them, a carbonate-based solvent is preferable, and a mixture of a cyclic carbonate (for example, ethylene carbonate or propylene carbonate) having a high ionic conductivity and a high dielectric constant which can increase the charge/discharge performance of a battery, and a linear carbonate compound having a low viscosity (for example, ethyl methyl carbonate, dimethyl carbonate or diethyl carbonate) is more preferable. In this case, when the cyclic carbonate and the chain carbonate are mixed in a volume ratio of about 1:1 to about 1:9, the performance of the electrolytic solution may be excellent.

The lithium salt can be used without any particular limitation as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used. The concentration of the lithium salt is preferably within the range of 0.1M to 2.0M. When the concentration of the lithium salt is within the above range, the electrolyte has an appropriate conductivity and viscosity, so that it can exhibit excellent electrolyte performance and the lithium ions can effectively move.

In addition to the electrolyte components, the electrolyte may contain, for example, One or more additives of a halogenated carbonate compound such as difluoroethylene carbonate, pyridine, triethylphosphite, triethanolamine, cyclic ether, ethylenediamine, glyme, hexametriamide, nitrobenzene derivatives, sulfur, quinone imine dyes, N-substituted oxazolidinones, N, N-Substituted imidazolidine, ethylene glycol dialkyl ether, ammonium salt, pyrrole, 2-methoxyethanol or aluminum trichloride for the purpose of improving the lifetime characteristics of the battery, suppressing the reduction of the battery capacity, and improving the discharge capacity of the battery. Herein, The additive may be included in an amount of 0.1 wt % to 5 wt % based on the total weight of the electrolyte.

As described above, the lithium secondary battery including the electrode manufactured using the conductive material according to the present invention stably exhibits excellent discharge capacity, output characteristics, and capacity retention rate due to the decrease in resistance due to the increase in the electrical conductivity in the electrode. As a result, it is useful for portable devices such as mobile phones, notebook computers, digital cameras, and electric vehicles such as hybrid electric vehicles (HEV).

According to another aspect of the present invention, there is provided a battery module including the lithium secondary battery as a unit cell and a battery pack including the same.

The battery module or the battery pack may be used as a middle or large size device power source of one or more of a power tool; an electric vehicle including an electric vehicle (EV), a hybrid electric vehicle, and a plug-in hybrid electric vehicle (PHEV); or a system for power storage.

Hereinafter, embodiments of the present invention will be described in detail so that those skilled in the art can easily carry out the present invention. The present invention may, however, be embodied in many different forms and should not be construed as limited to the embodiments set forth herein.

Production Example: Preparation of Carbon Particles Supporting Cobalt-Vanadium Catalyst An aqueous solution of a cobalt precursor $Co(NO_3)_2 \cdot 6H_2O$ and a vanadium precursor $NH_4VO_3$ was prepared to have a Co:V of molar ratio 10:1. Thereafter, the mixture was poured into a carbon black (acetylene black) carrier so that the content ratio of the Co—V catalyst was 1 wt %, stirred at 60° C. at 80 RPM and vacuum-dried for 60 minutes. At this time, the carbon black having a primary particle size of 50(±30) nm, a powder density of 0.05(±0.02) g/cc and a specific surface area of 150(±30) m$^2$/g was used.

Example 1

The carbon particles carrying the cobalt-vanadium catalyst prepared in the above Production Example were synthesized in a laboratory-scale fluidized bed reactor. Specifically, in a quartz tube reactor having an inner diameter of 58 mm and a length of 1200 mm, the temperature was raised to 650° C. in a helium:hydrogen (4:1) atmosphere and then maintained for 1 hour. Then, carbon nanofibers were synthesized for 10 minutes with a volume ratio of nitrogen, hydrogen, and ethylene gas of 5.5:1:1, with a total flow rate of 4000 ml per minute, to thereby prepare a carbon black-carbon nanofiber composite conductive material.

Examples 2 to 8

A composite conductive material was prepared in the same manner as in Example 1, except that the kind of the catalyst metal, the CNF synthesis temperature, the CNF synthesis gas, the synthesis time, the CNF growth yield, and the CNF type were adjusted as shown in Table 1.

Example 9

Carbon black (acetylene black) was stirred in $HNO_3$ solution at 80° C. for 3 hours to prepare oxidized carbon black. An aqueous solution of cobalt precursor $Co(NO_3)_2 \cdot 6H_2O$ and vanadium precursor $NH_4VO_3$ was prepared so that the molar ratio of Co:V was 10:1, and the solution is set to have the content ratio of the Co—V catalyst to the oxidized carbon black (acetylene black) of 1 wt %, stirred at 60° C. at 80 RPM, and vacuum dried for 60 minutes to carry carbon nanofiber synthesis catalyst to carbon black.

Thereafter, a composite conductive material was prepared in the same manner as in Example 1, except that the CNF synthesis temperature, the CNF synthesis gas, the synthesis time, the CNF growth yield, and the CNF type were adjusted as shown in Table 1.

Example 10

After preparing the carbon black-carbon nanofiber composite material as in Example 2, the composite conductive material was heat-treated at 800° C. for 30 minutes in a helium gas atmosphere.

TABLE 1

| | Catalyst metal | CNF synthesis temperature (° C.) | CNF synthesis gas | CNF synthesis time | CNF growth yield (%) | CNF type |
|---|---|---|---|---|---|---|
| Example 1 | Co-V | 650 | Ethylene | 10 min | 32.4 | Herringbone |
| Example 2 | | 675 | Ethylene | 10 min | 40.2 | Tubular |
| Example 3 | | 700 | Ethylene | 10 min | 46.3 | Tubular |
| Example 4 | | 675 | Carbon dioxide | 10 min | 10.5 | Herringbone |
| Example 5 | | 675 | Methane | 10 min | 21.9 | Herringbone |
| Example 6 | | 675 | Ethylene | 5 min | 35.7 | Tubular |
| Example 7 | | 675 | Ethylene | 8 min | 38.3 | Tubular |
| Example 8 | | 675 | Ethylene | 12 min | 42.6 | Tubular |
| Example 9 | | 675 | Ethylene | 10 min | 41.2 | Tubular |
| Example 10 | | 675 | Ethylene | 10 min | 40.1 | Tubular |

*CNF Growth Yield (%) = (Weight change after CNF synthesis (g)/Weight of catalyst supported carbon support (g)) × 100

Comparative Example 1

The catalyst for synthesizing carbon nanofibers alone without spherical carbon particles in the preparation example is prepared by preparing an aqueous solution of cobalt precursor $Co(NO_3)_2 \cdot 6H_2O$ and vanadium precursor $NH_4VO_3$ so that the molar ratio of Co:V is 10:1, and it is supported on $Al_2O_3$ support ($D_{50}$=76 μm, Pore Volume=0.64 $cm^3/g$, Surface Area=237 $m^2/g$, manufactured by Saint Gobain) to be 1 wt %, then stirred at 60° C. at 80 rpm and vacuum-dried for 60 minutes. Carbon nanofibers were prepared in the same manner as in Example 1, except that the CNF synthesis temperature was changed to 675° C. Also, to remove the $Al_2O_3$ support from the carbon nanofibers prepared, the solution was treated with 1M NaOH solution at 80° C. for 2 hours, sufficiently washed with distilled water, and then dried at 130° C. for 5 hours to prepare a conductive material.

Comparative Example 2

A commercially available acetylene black was used as the conductive material. The conductive material had a specific surface area of 150(±30) $m^2/g$ and a primary particle size of 50(±30) nm.

Comparative Example 3

As the conductive material, a mixture of the carbon nanofibers of Comparative Example 1 and the carbon black of Comparative Example 2 in a ratio of 40:60 was used.

<Comparative Example 4> a Composite Conductive Material Having a Low Density of Carbon Black Powder Carbon particles carrying a cobalt-vanadium catalyst were prepared in the same manner as in the preparation example except that the powder density of the carbon black was 0.020 to 0.024 g/cc. Then, a carbon black-carbon nanofiber composite conductive material was prepared in the same manner as in Example 1.

Comparative Example 5

2 g of a cobalt oxide ($Co_3O_4$) powder (Sigma Aldrich 637025, purity: 99.8%, primary particle size: 20 to 30 nm) as a catalyst for producing carbon nanofibers was added to 200 g of ethanol, and the mixture was dispersed in a wet bead mill (Asada Ironworker, PCMLR) for one hour. 130 g of zirconia beads of 0.3 mm in diameter were used as media beads. 38 g of carbon black (specific surface area of 39 $m^2/g$, DBP absorption amount of 140 ml/100 g) and 700 g of ethanol were added to the treated slurry and mixed with a stirring bladed stirrer, followed by filtration and drying to obtain raw material powder. Then, the obtained raw material powder was charged into a reaction container made of quartz glass, and loaded in a carbon nanofiber producing apparatus. The inside of the apparatus was made into a vacuum atmosphere, and then nitrogen gas was charged to a pressure of 0.1 MPa and the temperature was raised to 600° C. Subsequently, it was replaced with hydrogen gas and maintained for 30 minutes. Subsequently, a raw material gas containing 55 vol % of carbon monoxide gas, 20 vol % of hydrogen gas, and 25 vol % of nitrogen gas were introduced into the apparatus and supported for 1 hour. Subsequently, the interior of the device was replaced with nitrogen gas, cooled to room temperature, and the device was opened to recover the product in the reaction vessel to complete the production of the conductive material (CNF growth yield was 18%).

Experimental Example 1: Measurement of Specific Surface Area

Samples prepared in Examples and Comparative Examples were measured for specific surface area using ASAP2460 instrument of MicroActive. The specific surface area was calculated from the $N_2$ Adsorption/Desorption Isotherm at a temperature of 77K for each of the powder samples of 0.1 g using the BET method, and the results are shown in Table 2.

Experimental Example 2: UV-Vis. Absorbance Measurement 0.1 w % of the conductive material of the above example and the comparative example was added to 100 ml of N-methylpyrrolidone (NMP) to prepare a mixed solution. UV-Vis. absorbance was measured at 25 and 500 nm using a UV-Vis analyzer (Optizen analyzer, Mecasys co.), and the results are shown in Table 2.

Experimental Example 3: Measurement of Volume Resistivity (Slurry Powder Resistance)

A $LiCoO_2$ positive electrode active material, a PVDF binder, and conductive materials of the above Examples and Comparative Examples were mixed in a NMP (N-methylpyrrolidone) solvent in a weight ratio of 98.5:0.5:1 to prepare a positive electrode slurry, which was dried and pulverized at 130 to prepare powdery slurry powder.

The specimens described above were obtained by the Sabot method using a Loresta GP manufactured by Mitsubishi Kagaku Nanaritik under the conditions of a load of 9.8 MPa at 23° C. and a relative humidity of 50%. The results are shown in Table 2.

Experimental Example 4: Measurement of Discharge Capacity Ratio

A $LiCoO_2$ positive electrode active material, a PVDF binder, and conductive materials of the above examples and comparative examples were mixed in a solvent of N-methylpyrrolidone (NMP) at a weight ratio of 98.5:0.5:1 to prepare a positive electrode slurry, and this was coated on a 20 μm aluminum foil to prepare a positive electrode dried at 130° C. The negative electrode was prepared by mixing graphite, SBR/CMC, and conductive materials in a weight ratio of 96.5:2.5:1 to prepare negative electrode slurry, which was coated on a 10 μm copper foil and dried at 100° C. to produce a negative electrode. A monocell was fabricated by combining the above-mentioned positive electrode, negative electrode and 15 μm polyethylene separator, and the discharge capacity at 2.0 C versus 0.2 C discharge capacity was measured. Then the results are shown in Table 2.

dispersibility of the fiber conductive material is shown. In particular, the absorbances of the composite conductive materials of Examples 2 and 9 were equivalent to those of Comparative Example 2 using carbon black alone, indicating that the dispersibility was improved to the carbon black level.

The carbon black-carbon nanofiber composite conductive material of Examples 1 to 10 exhibited excellent results in improvement of powder resistance and 2.0 C high-rate discharge capacity as compared with the conductive material to which carbon black of Comparative Example 2 alone was applied and exhibited excellent results in 2.0 C high-rate discharge capacity as compared with the conductive material to which the simple mixture of carbon black and carbon nanofibers is applied.

Further, it was confirmed that the composite conductive material according to Examples 1 to 10 exhibited excellent results in powder resistance and 2.0 C high-rate discharge capacity as compared with Comparative Example 4 using low-density carbon particles having a powder density of less than 0.025 g/cc. As such, the composite conductive material of the present invention preferably has a powder density of not less than 0.025 g/cc, more preferably not less than 0.03 g/cc for improvement of adhesion and conductivity between carbon particles and carbon nanofibers.

The composite conductive material of Comparative Example 5 was found to be weak in volume resistivity and high rate discharge characteristics as compared with the

TABLE 2

| | Conductive material type | Specific surface area (m$^2$/g) | UV-vis. Absorbance | Volume resistivity (Ω · cm) | Discharge capacity ratio (%, compared to 0.2 C discharge capacity) |
|---|---|---|---|---|---|
| Example 1 | CNF/CB complex | 190 | 1.28 | 121 | 91.4 |
| Example 2 | | 240 | 1.53 | 53 | 93.8 |
| Example 3 | | 275 | 1.40 | 82 | 92.7 |
| Example 4 | | 160 | 1.29 | 143 | 90.3 |
| Example 5 | | 170 | 1.31 | 136 | 91.1 |
| Example 6 | | 215 | 1.46 | 74 | 93.2 |
| Example 7 | | 230 | 1.48 | 65 | 93.5 |
| Example 8 | | 255 | 1.45 | 77 | 93.1 |
| Example 9 | | 245 | 1.56 | 55 | 93.6 |
| Example 10 | | 235 | 1.51 | 51 | 94.0 |
| Comparative example 1 | CNF alone | 80 | 1.27 | 76 | 87.2 |
| Comparative example 2 | CB alone | 150 | 1.69 | 151 | 75.3 |
| Comparative example 3 | CNF/CB simple mixture | 120 | 1.38 | 112 | 85.2 |
| Comparative example 4 | CNF/CB complex | 255 | 1.43 | 98 | 89.8 |
| Comparative example 5 | CNF/CB complex | 65 | 1.72 | 186 | 71.4 |

As can be seen from the above Table 2, the conductive material using the carbon nanofibers alone in Comparative Example 1 exhibited the lowest absorbance due to the non-dispersibility of the material itself and the aggregation phenomenon, and the conductive material using the carbon black alone in Comparative Example 2 alone exhibited high absorbance due to high dispersibility.

Since the absorbance of the carbon black-carbon nanofiber composite electroconductive materials of Examples 1 to 10 according to the present invention is higher than the absorbance of Comparative Example 1 using carbon nanofibers singly, it is confirmed that the effect of improving the conductive materials of Examples 1 to 10. This seems to be because the specific surface area of the carbon black forming the conductive material of Comparative Example 5 is small and the growth yield of CNF is too low to form a sufficient conduction path.

On the other hand, Example 9 in which the carbon black was oxidized before supporting the catalyst showed much better dispersion and conductivity performance (volume resistance and discharge capacity ratio) than in Example 1. This is because the functional group of the oxidized portion functions as an anchorage site for supporting the catalyst and nano-drilling is effectively controlled.

Example 10 illustrates a composite conductive material obtained by performing a high temperature treatment to a carbon black-carbon nanofiber composite material of Example 2 under an inert atmosphere, and the composite conductive material shows a better performance compared with the conductive performance (volume resistance and discharge capacity ratio) of the conductive material of Example 2. This is because the mutual adhesion strength is further enhanced by an increase in the degree of graphitization of the carbon crystal between the carbon black and the carbon nanofibers through the additional high temperature heat treatment, and the electrical conductivity is also greatly improved.

DESCRIPTION OF SYMBOLS

100: carbon particle
200: catalyst
300: carbon nanofiber

The invention claimed is:

1. A method for producing a composite conductive material, comprising:
   (S1) supporting catalyst particles on surfaces of spherical carbon particles;
   (S2) heat treating the catalyst particles in a helium or hydrogen atmosphere such that the catalyst particles penetrate the surfaces of the spherical carbon particles and are impregnated beneath the surfaces of the spherical carbon particles at a contact point between the spherical carbon particles and the impregnated catalyst particles;
   (S3) heating the spherical carbon particles having the impregnated catalyst particles in the presence of a source gas to grow carbon nanofibers from the impregnated catalyst particles to form the composite conductive material, wherein the source gas contains a carbon source, and wherein the carbon nanofibers extend from the contact point to above the surfaces of the spherical carbon particles, and
   oxidizing the spherical carbon particles prior to supporting the catalyst particles on the spherical carbon particles in step (S1).

2. The method according to claim 1, further comprising: heat treating the carbon nanofibers in an inert atmosphere.

3. The method according to claim 1, wherein, in step (S3), the carbon nanofibers are grown in 15 minutes or less.

4. The method according to claim 1, wherein the carbon source is one or a mixture of two or more selected from the group consisting of carbon monoxide, methane, ethane, ethylene, ethanol, acetylene, propane, propylene, butane, butadiene, pentane, pentene, and cyclopentadiene.

5. The method according to claim 1, wherein the catalyst particles are not removed from the composite conductive material after formation of the carbon nanofibers.

6. The method according to claim 1, wherein the carbon nanofibers have a shape selected from the group consisting of a platelet shape, a herringbone shape, and a tubular shape.

* * * * *